United States Patent [19]
Ruehle

[11] 4,101,866
[45] Jul. 18, 1978

[54] MARINE DETECTOR SPREAD HAVING ARRAYS OF DIFFERENT LENGTHS

[75] Inventor: William H. Ruehle, Duncanville, Tex.

[73] Assignee: Mobil Oil Corporation, New York, N.Y.

[21] Appl. No.: 715,762

[22] Filed: Aug. 18, 1976

[51] Int. Cl.² .................................................. G01V 1/38
[52] U.S. Cl. ............................ 340/7 R; 340/15.5 MC
[58] Field of Search ......... 340/7 R, 15.5 MC, 15.5 F, 340/15.5 GC

[56] References Cited

U.S. PATENT DOCUMENTS

| | | | |
|---|---|---|---|
| 3,096,846 | 7/1963 | Savit et al. | 340/15.5 R |
| 3,335,401 | 8/1967 | Kerns | 340/15.5 MC |
| 3,400,783 | 9/1968 | Lee et al. | 340/15.5 MC |
| 3,430,193 | 2/1969 | Lindsey et al. | 340/15.5 MC |
| 3,613,071 | 10/1971 | Quay | 340/7 R |
| 3,863,201 | 1/1975 | Briggs et al. | 340/15.5 GC |
| 3,887,897 | 6/1975 | Neitzel | 340/7 R |
| 4,011,539 | 3/1977 | Rogers | 340/7 R |

Primary Examiner—Howard A. Birmiel
Attorney, Agent, or Firm—C. A. Huggett; George W. Hager, Jr.

[57] ABSTRACT

A detector spread for marine seismic exploration has arrays with lengths which are dependent upon the acoustic velocity and dip of the subsurface formations being explored, upon the offset distance from the seismic source to the array and upon the reflection time of reflections from formations of interest. Hydrophones are positioned at approximately equally spaced intervals on a towing cable. The outputs of these hydrophones are combined to form arrays having lengths which are multiples of the intervals. Each array has the longest length possible, such that reflection amplitude response will remain in the band $0 \leq \Delta T/\tau \leq 1$.

4 Claims, 5 Drawing Figures

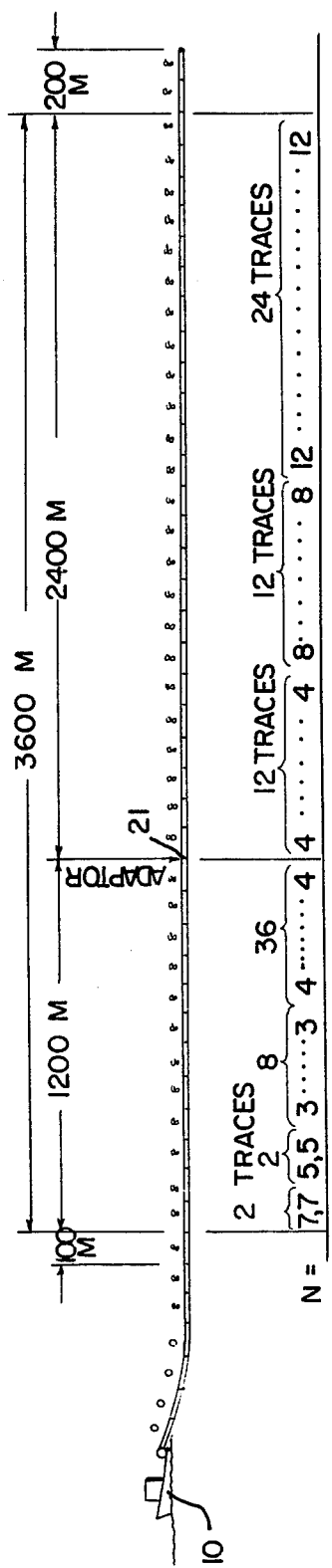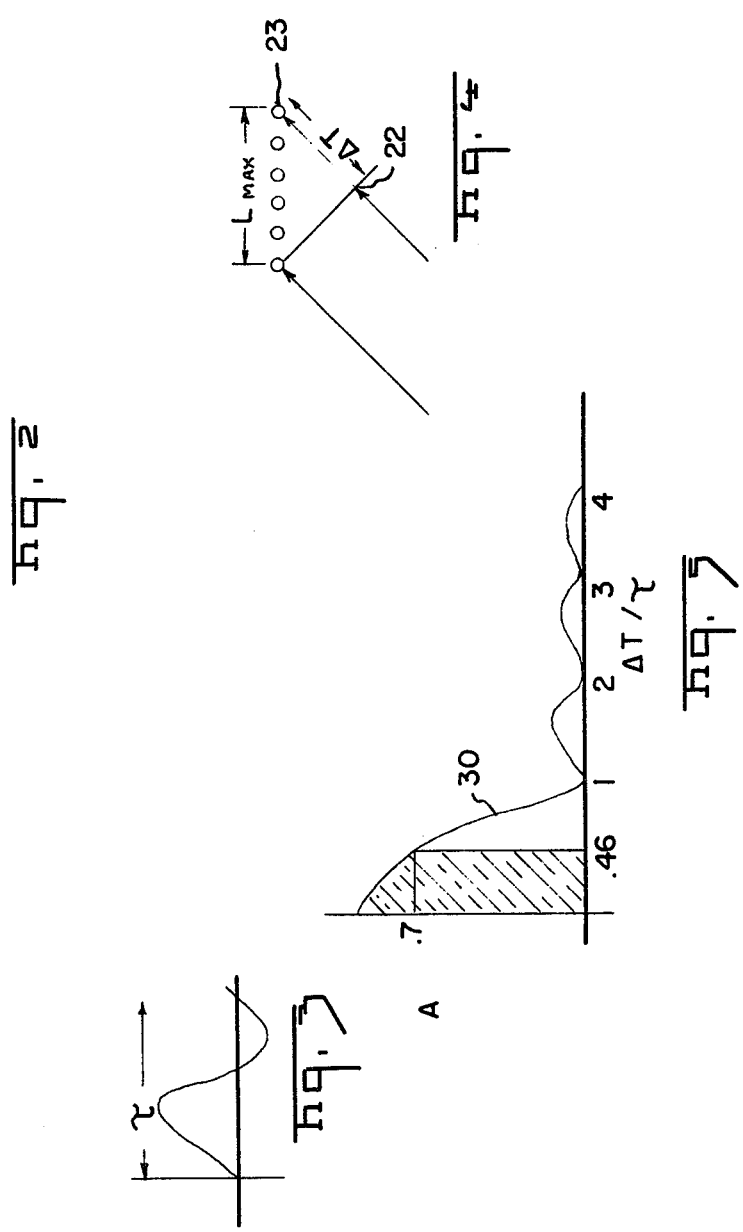

MARINE DETECTOR SPREAD HAVING ARRAYS OF DIFFERENT LENGTHS

BACKGROUND OF THE INVENTION

This invention relates to seismic exploration and, more particularly, to a string of detectors having array lengths with improved response for the geology of the area being explored, for the offset distance from the seismic source to the array, and for the reflection time on the seismograms of reflections from formations of interest. The invention is primarily useful in marine seismic exploration but can also be used for seismic exploration on land.

In marine seismic exploration, seismic energy is generated by a linear string of sources and is detected by a long linear string of detectors, or hydrophones. The string of sources and the string of detectors are towed behind the boat. Copending application Ser. No. 669,077, filed Mar. 22, 1976, Vertically Directive Arrays for Marine Seismic Exploration — William H. Ruehle, describes a linear string of seismic sources suitable for use.

U.S. Pat. No. 3,613,071 — Roy G. Quay, shows a typical prior art string of detectors towed by a cable. Groups of detectors are combined to form arrays. This patent describes using a long array to attenuate low frequency noise and a shorter array to detect the high frequency components of shallow reflections.

SUMMARY OF THE INVENTION

In accordance with this invention, the lengths of the seismic detector arrays are changed to achieve the best response for the geology of the area being explored, for the offset distance between the seismic source and the detector array and for the arrival time of reflections from formations of interest.

A compositor combines the outputs of adjacent detectors in a string to form detector arrays of various lengths. These lengths are changed so that each array has the maximum length possible, such that the amplitude response of the array is within the pass band.

In accordance with a further aspect of this invention, the seismic detectors are positioned much closer to the source than was previously done in the prior art. The towing cable for the detectors forms an arc from the stern of the towing boat down to a depth at which the detector spread extends substantially horizontally. Heretofore, detectors have been used only on the horizontally extending portion of the string. Because of this, the closest detector arrays to the source frequently have a long offset distance from the source. It is desirable to have short offset distances to record reflections from near surface formations. In accordance with this invention, detectors are positioned on the arcuate portion of the cable which is in front of the horizontally extending portion. These detector arrays are relatively close to the source and seismograms from these arrays can be used for exploration of near surface formations.

The foregoing and other objects, features and advangtages of the invention will be better understood from the following more detailed description and appended claims.

DESCRIPTION OF THE DRAWINGS

FIG. 2 shows one example of a detector spread in accordance with this invention;

FIG. 3 depicts the period of a seismic pulse;

FIG. 4 depicts the time $\Delta T$; and

FIG. 5 shows the amplitude response of an array.

DESCRIPTION OF THE PREFERRED EMBODIMENT

Figure 1:
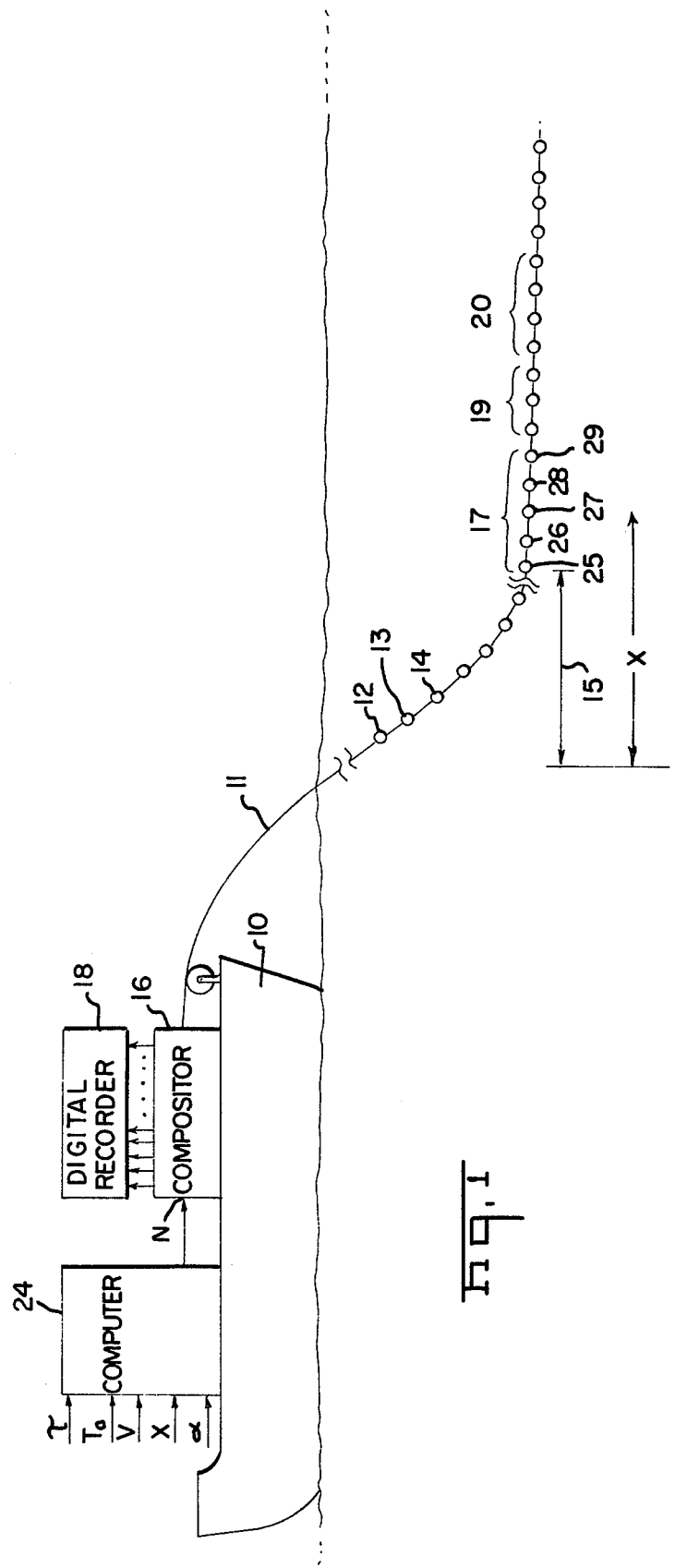
FIG. 1 depicts a portion of the detector spread together with the marine vessel and compositor.

FIG. 1 shows a marine vessel 10 towing a cable 11 with a long linear detector spread. A plurality of hydrophones 12, 13, 14 and others are included in the cable 11 at approximately equally spaced intervals. The hydrophones detect reflections of seismic energy from a periodic source which is not shown in FIG. 1. This source preferably is a linear array of air guns as described in the Ruehle pending application previously identified.

The hydrophones 12, 13 and 14 are on the arcuate portion of the cable 11 which is in front of the horizontally extending portion. The distance from the seismic source to the end of this arcuate portion, which distance is noted by the arrow designated 15, may be on the order of 800 to 1,000 feet. In accordance with this invention, the hydrophones on the arcuate portion are used, thereby producing seismograms from detectors with a reduced offset distance from the source. These short offset seismograms are particularly useful for identifying reflections from near surface formations.

A compositor 16 combines the outputs of adjacent hydrophones to form hydrophone arrays having lengths which are multiples of the intervals between the hydrophones. One compositor which is suitable for use is the DSS-V amplifier module supplied by Seismic Engineering Company. This module is described in "Digital Quality Seismic Streamer System" by W. H. Luehrmann, Paper No. OTC-2019, Sixth Annual Offshore Technology Conference, Houston, Texas, May 6–8, 1974. This compositor amplifies the output from each hydrophone in the string and provides high level outputs at low impedances. Up to nine outputs from the string can be combined through a resistive summing network. This resistive summing network allows the outputs in each array to be weighted, one with respect to the other.

As an example, the outputs of the five hydrophones in the array 17 are combined in the compositor 16 to form one seismic trace which is recorded on the digital recorder 18. The outputs from the three hydrophones in the array 19 are similarly combined, and the outputs from the four hydrophones in the array 20 are combined in the compositor 16.

The compositor also weights the outputs of the hydrophones so that the composite trace is the weighted sum of the outputs. The compositor previously identified includes a resistive matrix for changing the relative amplitudes of the outputs of each hydrophone in the array. The weighted relative amplitudes of the outputs of the hydrophones are given by:

$$A = \frac{\sin n/N \, \pi}{n/N \, \pi}$$

where A is amplitude, n is the spatial frequency at which A is evaluated, and N is the total number of hydrophones in the array. For example, the relative amplitudes of the hydrophones in the array 17, N=5, are:

| Hydrophone | Weight |
|---|---|
| 25 (n = 2) | .3 |
| 26 (n = 1) | .75 |
| 27 (n = 0) | 1.0 |
| 28 (n = 1) | .75 |
| 29 (n = 2) | .3 |

FIG. 2 shows one example of how the outputs of all of the hydrophones in the string are combined to form arrays of different lengths. In the example, the streamer has 312 hydrophone groups spaced at 12.5 meter centers. (Each group has 16 detectors at 0.67 m. spacing, but for clarity of description, a hydrophone group will hereafter be referred to as a hydrophone). A total of 208 outputs are available at the boat. Adaptors placed at the beginning and at the point 21 permit combining individual hydrophones to effect longer units. The output of each trace is balanced to a common level. Up to 96 channels are digitally recorded. The outputs of the first 104 hydrophones are brought directly to the compositor on the boat. Beyond the adaptor at 21, the outputs of the last 208 hydrophones are combined in pairs before they are brought back to the boat.

At the compositor 16 the outputs of the first seven hydrophones in the string are combined and the outputs of the next seven hydrophones are combined. This forms two traces of seven outputs each (N=7,7). The next five outputs are combined to form a five hydrophone array and the next five are combined to form another trace having five hydrophone outputs (N=5,5). Continuing the sequence, there are eight traces having the outputs of three hydrophones and there are 36 traces having the outputs of four hydrophones.

After the adaptor at 21, twelve traces are formed from the outputs of four hydrophones each, twelve traces are formed from the outputs of eight hydrophones each and 24 traces are formed from the outputs of 12 hydrophones each.

In the example shown in FIG. 2, the weighting for the traces ahead of the adaptor 21 is as follows:

N = 7 — 0.3, 0.78, 0.9, 1, 0.9, 0.78, 0.3
N = 5 — 0.3, 0.75, 1, 0.75, 0.3
N = 3 — 1, 1, 1 (Unity)
N = 4 — 1, 1, 1, 1 (Unity)

The weighting for the traces behind the adaptor 21 is unity.

The manner in which the lengths of the different arrays are determined is as follows. At each trace location the longest possible array is used such that the reflection amplitude response will remain in the band 0 $\leq \Delta T/\tau \leq$ 1. In the foregoing $\tau$ is the period of the seismic pulse. FIG. 3 depicts a seismic pulse and shows its period. FIG. 4 depicts a reflected seismic wave striking an array of six detectors. $\Delta T$ is the time required for a seismic pulse to travel from the point 22 to the detector 23. Stated another way, it is the time required for a seismic pulse to travel from the plane wave front at a point where it strikes a detector at one end of the array to the detector at the other end of the array.

The amplitude response of a linear array of detectors is given by:

$$A = \frac{\sin \pi \Delta T/\tau}{\pi \Delta T/\tau} \quad (1)$$

This response is shown in FIG. 5. As previously mentioned, the array has the longest possible length such that the amplitude response is in the band where $\Delta T/\tau$ < 1. Preferably, the length of the array is chosen so that the response falls in the cross-hatched area of FIG. 5. The point of least attenuation is at $\Delta T/\tau = 0.46$. The desired band is defined by values of $\Delta T/\tau$ which are less than 0.46. That is, $$\Delta T/\tau \leq 0.46 \quad (2)$$

The band defines $L_{max}$ in the following manner.

The maximum length of an array, $L_{max}$, is related to $\Delta T$ by the following:

$$\Delta T = L_{max} \delta t \quad (3)$$

where $\delta t$ is the moveout of a reflection per unit distance along the array. (Hereafter, $\delta t$ is the moveout per foot.) Substituting $\Delta T$ from equation (3) into the band criterion of equation (2) we have the following:

$$L_{max} = 0.46 \, \tau/\delta t \quad (4)$$

That is, the length of each array is a function of the period $\tau$ and moveout $\delta t$ of the seismic reflections. These in turn are dependent upon the geology of the formation being explored and upon the offset distance between the source and the center of the array. Specifically, the moveout per unit distance is determined from:

$$\delta t = \frac{X}{T} \cdot \frac{1}{V^2} \pm \frac{T_0 \sin \alpha}{VT} \quad (5)$$

$$T = \frac{H^2}{V^2} + T_0^2 \pm \frac{2HT_0 \sin \alpha}{V} \quad (6)$$

(positive signs for array down dip of source). The foregoing shows that $\delta t$ is dependent on:

X, array offset from the source as shown in the example of FIG. 1;
T, reflection time on the seismograms of reflections from formations of interest;
$T_0$, the zero offset reflection time;
V, acoustic velocity of the formations being explored;
$\alpha$, dip of the formation being explored;
$\tau$, period of the reflection;
H, the horizontal distance between the source and receiver.

The approximate acoustic velocity, dip and reflection time of formations of interest are known to the geophysicist, either by prior exploration or by simple approximation. The period of the seismic wave is also approximately known for varying depths or reflection times. These approximations are applied to the computer 24 which determines N, the number of detectors in each array. Any small commercially available general purpose computer can be used to determine N.

As an example of the manner in which the lengths of the arrays are changed in accordance with the input approximations, consider the following tables which define the lengths of the arrays in terms of the number N of detectors with 12.5 meter spacings between them. This system emphasizes reflections from formations whose period, time and velocity distribution is given in the first three columns of the table.

$L_{max} = .46 \, \tau/\delta t$
0° Nominal
N = Number

-continued $L_{max} = .46\, \tau/\delta t$

| Case | $\tau$ | $T_0$ | V | X | $\delta t \times 10^4$ | $L_{max}$ in feet | of detectors with 12.5m. spacing |
|---|---|---|---|---|---|---|---|
| 1 | .025 | 0.5 | 5000 | 2500 | 1.5364 | 75 | 3 |
| 2 | .025 | 1.0 | 7500 | 5000 | .7414 | 155 | 5 |
| 3 | .025 | 1.5 | 10000 | 7500 | .4479 | 257 | 7 |
| 4 | .025 | 2.0 | 12000 | 10000 | .3205 | 359 | 10 |
| 5 | .030 | 2.0 | 12000 | 10000 | .3205 | 430 | 11 |
| 6 | .040 | 2.0 | 12000 | 10000 | .3205 | 574 | 15 |
| 7 | .040 | 4.0 | 15000 | 12000 | .1307 | 1408 | 35 |

30° Maximum

| Case | $\tau$ | $T_0$ | V | X | $\delta t \times 10^4$ | $L_{max}$ in feet with 12.5m. | N = Number of detectors |
|---|---|---|---|---|---|---|---|
| 1 | .025 | 0.5 | 5000 | 2500 | 1.7821 | 68 | 3 |
| 2 | .025 | 1.0 | 7500 | 5000 | 1.0706 | 113 | 4 |
| 3 | .025 | 1.5 | 10000 | 7500 | .7664 | 150 | 5 |
| 4 | .025 | 2.0 | 12000 | 10000 | .7559 | 160 | 5 |
| 5 | .030 | 2.0 | 12000 | 10000 | .7559 | 182 | 5 |
| 6 | .040 | 2.0 | 12000 | 10000 | .7559 | 240 | 7 |
| 8 | .040 | 4.0 | 15000 | 12000 | .4191 | 439 | 12 |

The procedure for determining the number of detectors in each array is as follows:

1. Fill time-velocity columns from input approximations.
2. Select the time dependent lower frequency bound of attenuated shot pulse; in this example, $\tau$ is 0.025 from 0 to 2 secs. and 0.040 from 2.0 to 4.0 seconds.
3. Compute the mute pattern used for processing. For marine work, the least mute occurs along a line where $x = 5,000t$. The maximum array will occur at this distance for any time.
4. Estimate the maximum dip as it varies with time. In the first table, 30° is chosen for all times. The second table depicts the flat dip case.
5. Determine the values of $\delta t$ from equations (5) and (6).
6. Calculate $L_{max} = 0.46 \delta t^{-1}$, the length of an equally weighted array for which the reflection described by parameters of the table will fall in the array pass band.
7. If arrays are to be non-uniformly weighted, calculate their response curve using the dimensionless coordinates $\Delta T/T$ and pick that value of $\Delta T/T$ which has the response 0.707. This number will replace 0.46 in the equation for $L_{max}$.

Study of the above tables shows that a wide range of array lengths satisfy an objective depending upon expected parameters, ranging from 75 feet to 1408 feet for 30° dip shallow to 0° deep.

Various modifications may be made. For example, instead of a band which is less than $\Delta T/\tau = 0.46$, the band can be made less than the point of maximum slope on the response curve. This point of maximum slope is indicated by the reference numeral 30 in FIG. 5. It is a value of $\Delta T/\tau \simeq 0.68$. This point of maximum slope can be used to separate primary and multiple reflections on the response curve introducing a multiple reflection suppression.

The invention is applicable to land systems using a cable similar to the string of hydrophones hereinbefore described. One additional modification is required. Trace weighting and combining is distance dependent. The length of the arrays for land shooting will depend upon the noise characteristics measured in the area of application.

Other modifications may be made. The appended claims are, therefore, intended to cover all such modifications within the true spirit and scope of the invention.

What is claimed is:

1. A method of seismic exploration utilizing at least one seismic energy source and a linear array of equally spaced seismic detectors, comprising the steps of:
    (a) determining the acoustic velocity and dip of the subsurface formations and the seismic reflection times from said formations,
    (b) combining the outputs of adjacent detectors in the linear array of equally spaced seismic detectors to form initial arrays having lengths selected in accordance with said acoustic velocity, dip, and reflection times,
    (c) periodically firing the seismic energy source to produce pulses of seismic energy,
    (d) detecting the reflected seismic energy with said initial arrays of detectors,
    (e) determining the period of said reflected seismic energy,
    (f) determining the moveout per unit length along the detectors of said reflected seismic energy, and
    (g) changing the lengths of said initial arrays in accordance with the ratio of said period to said moveout per unit length for said reflected seismic energy.

2. The method of claim 1 further comprising the steps of:
    (a) determining for each array of detectors the travel time of the reflected seismic energy from a point at which it strikes a detector at one end of an array of detectors to the detector at the other end of the array of detectors required to yield a desired reflection amplitude response for said array, and
    (b) changing the length of each of said arrays in accordance with the ratio of said travel time to the period of said reflected seismic energy.

3. The method of claim 2 wherein the amplitude response of each detector array is selected at a point less than unity on the amplitude response curve.

4. The method of claim 2 wherein the amplitude response of each detector array is selected at the point of maximum slope located at a point less than unity on the amplitude response curve.

* * * * *

UNITED STATES PATENT AND TRADEMARK OFFICE
CERTIFICATE OF CORRECTION

PATENT NO. : 4,101,866

DATED : July 18, 1978

INVENTOR(S) : William H. Ruehle

It is certified that error appears in the above-identified patent and that said Letters Patent are hereby corrected as shown below:

The table bridging column 4, line 66, through column 5, line 21, should read as follows:

$$L_{max} = .46 \, \tau/\delta t$$

| Case | $\tau$ | $T_0$ | V | X | $\delta t \times 10^4$ | $L_{max}$ in feet (0° Nominal) | N = Number of detectors with 12.5m. spacing |
|------|------|-------|-------|-------|---------|------|----|
| 1 | .025 | 0.5 | 5000 | 2500 | 1.5364 | 75 | 3 |
| 2 | .025 | 1.0 | 7500 | 5000 | .7414 | 155 | 5 |
| 3 | .025 | 1.5 | 10000 | 7500 | .4479 | 257 | 7 |
| 4 | .025 | 2.0 | 12000 | 10000 | .3205 | 359 | 10 |
| 5 | .030 | 2.0 | 12000 | 10000 | .3205 | 430 | 11 |
| 6 | .040 | 2.0 | 12000 | 10000 | .3205 | 574 | 15 |
| 7 | .040 | 4.0 | 15000 | 12000 | .1307 | 1408 | 35 |

UNITED STATES PATENT AND TRADEMARK OFFICE
CERTIFICATE OF CORRECTION

PATENT NO. : 4,101,866
DATED : July 18, 1978
INVENTOR(S) : William H. Ruehle

It is certified that error appears in the above-identified patent and that said Letters Patent are hereby corrected as shown below:

Table continued from page 1:

$$L_{max} = .46\ \tau/\delta t$$

| Case | $\tau$ | $T_0$ | V | X | 30° Maximum | | |
|------|--------|-------|------|-------|-------------|-------------------|--------------------------------------------|
| | | | | | $\delta t \times 10^4$ | $L_{max}$ in feet | N = Number of detectors with 12.5m. spacing |
| 1 | .025 | 0.5 | 5000  | 2500  | 1.7821 | 68  | 3  |
| 2 | .025 | 1.0 | 7500  | 5000  | 1.0706 | 113 | 4  |
| 3 | .025 | 1.5 | 10000 | 7500  | .7664  | 150 | 5  |
| 4 | .025 | 2.0 | 12000 | 10000 | .7559  | 160 | 5  |
| 5 | .030 | 2.0 | 12000 | 10000 | .7559  | 182 | 5  |
| 6 | .040 | 2.0 | 12000 | 10000 | .7559  | 240 | 7  |
| 7 | .040 | 4.0 | 15000 | 12000 | .4191  | 439 | 12 |

Signed and Sealed this

Twenty-seventh Day of February 1979

[SEAL]

Attest:

RUTH C. MASON
Attesting Officer

DONALD W. BANNER
Commissioner of Patents and Trademarks